United States Patent
Nakagawa (10) Patent No.: US 8,452,161 B2
(45) Date of Patent: May 28, 2013

(54) RECORDING AND REPRODUCING APPARATUS AND RECORDING AND REPRODUCING METHOD

(75) Inventor: Koichi Nakagawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/528,212

(22) Filed: Jun. 20, 2012

(65) Prior Publication Data
US 2012/0257868 A1 Oct. 11, 2012

Related U.S. Application Data

(63) Continuation of application No. 11/671,067, filed on Feb. 5, 2007, now Pat. No. 8,238,712.

(30) Foreign Application Priority Data

Feb. 17, 2006 (JP) ................................. 2006-041656

(51) Int. Cl.
*H04N 5/94* (2006.01)
*H04N 5/775* (2006.01)

(52) U.S. Cl.
USPC ........... 386/289; 386/230; 386/290; 386/278; 386/294; 715/788; 715/792; 715/783; 715/764; 715/817

(58) Field of Classification Search
USPC .. 386/230, 289, 290, 278, 294, 241; 715/788, 715/792, 783, 764, 817
See application file for complete search history.

(56) References Cited

U.S. PATENT DOCUMENTS

| | | | | |
|---|---|---|---|---|
| 5,701,385 A | * | 12/1997 | Katsuyama et al. | 386/329 |
| 5,963,204 A | * | 10/1999 | Ikeda et al. | 715/723 |
| 6,065,015 A | * | 5/2000 | Kazami | 352/67 |
| 6,295,139 B1 | * | 9/2001 | Yamauchi et al. | 358/443 |
| 6,681,061 B2 | * | 1/2004 | Agata et al. | 382/305 |
| 6,982,722 B1 | * | 1/2006 | Alben et al. | 345/596 |
| 7,333,722 B2 | * | 2/2008 | Kushibe et al. | 386/241 |
| 7,386,806 B2 | * | 6/2008 | Wroblewski | 715/788 |
| 7,747,965 B2 | * | 6/2010 | Holecek et al. | 715/781 |
| 7,954,065 B2 | * | 5/2011 | Ubillos | 715/793 |
| 7,992,092 B2 | * | 8/2011 | Mori | 715/769 |
| 8,238,712 B2 | * | 8/2012 | Nakagawa | 386/230 |
| 8,347,234 B2 | * | 1/2013 | Akagi | 715/838 |
| 2005/0188326 A1 | * | 8/2005 | Ikeda | 715/788 |

* cited by examiner

*Primary Examiner* — Helen Shibru
(74) *Attorney, Agent, or Firm* — Cowan, Liebowitz & Latman, P.C.

(57) ABSTRACT

A recording and reproducing apparatus which records and reproduces data with respect to a plurality of recording media includes a display unit for simultaneously displaying, on a display screen having a display area for each recording medium, data recorded onto recording media in corresponding display areas, a selection unit for selecting specific data from the data displayed on the display screen, and a designation unit for designating a moving destination of the selected data. If a display area other than a recording medium as a recording source of the selected data exists in the moving destination designated by the designation unit, the selected data is duplicated or moved to a recording medium corresponding to the display area.

15 Claims, 9 Drawing Sheets

RECORDING AND REPRODUCING APPARATUS AND RECORDING AND REPRODUCING METHOD

CROSS-REFERENCE TO RELATED APPLICATION

This application is a continuation of application Ser. No. 11/671,067, filed Feb. 5, 2007, the entire disclosure of which is hereby incorporated by reference.

BACKGROUND OF THE INVENTION

1. Field of the Invention

The present invention relates to a method of managing data such as still images and motion images recorded on a recording medium.

2. Description of the Related Art

Recently, digital still cameras and digital video cameras capable of using two or more types of recording media are increasing in number. An apparatus like this can record still images and motion images onto these recording media, and the user can view the recorded images regardless of the type of recording media. Also, many cameras have functions of, e.g., duplicating and moving data between different recording media, in order to allow the user to move images to a recording medium readily usable on a personal computer (PC) or the like, or duplicate images to a more inexpensive recording medium to give it to an acquaintance. These operations are generally performed in a reproduction mode of a recording medium recording images to be duplicated/moved.

Japanese Patent Laid-Open No. 2004-015308 describes a technique by which a user inputs, by drag & drop or the like, instructions to select image data recorded onto a recording medium and record the selected image data onto another recording medium, thereby recording the selected image data and its related information onto the other recording medium.

Unfortunately, the reproduction mode is activated for each recording medium. In the reproduction mode of a recording medium as a duplication/moving source, therefore, it is impossible to check the contents of images recorded onto a recording medium as a duplication/moving destination. Also, the user must switch the reproduction mode of the duplication/moving source recording medium to that of the duplication/moving destination recording medium whenever checking the contents of images.

On the other hand, when operating a PC, the user generally performs duplication/movement by drag & drop while viewing the contents of a duplication/moving source and duplication/moving destination.

Unfortunately, for a digital camera or the like having only a limited operation unit such as a cross key which designates up, down, left, and right, it is difficult to use an operation device to be operated with a mouse or the like.

SUMMARY OF THE INVENTION

The present invention has been made in consideration of the above situation, and has as its object to provide a technique by which a user can, e.g., duplicate, move, or erase an image with a simple operation while checking the contents of images recorded onto a plurality of recording media on the same screen.

In order to achieve the above object, according to the present invention, there is provided a recording and reproducing apparatus which records and reproduces data with respect to a plurality of recording media, comprising: a display unit adapted to simultaneously display, on a display screen having a display area for each recording medium, data recorded onto recording media in corresponding display areas; a selection unit adapted to select specific data from the data displayed on the display screen; and a designation unit adapted to designate a moving destination of the selected data, wherein if a display area other than a recording medium as a recording source of the selected data exists in the moving destination designated by the designation unit, the selected data is duplicated or moved to a recording medium corresponding to the display area.

There is also provided a recording and reproducing apparatus which records and reproduces data with respect to a plurality of recording media, comprising: a display unit adapted to simultaneously display, on a display screen having a display area for each recording medium, data recorded onto recording media in corresponding display areas; a selection unit adapted to select specific data from the data displayed on the display screen; and a designation unit adapted to designate a moving destination of the selected data, wherein if no display area other than a recording medium as a recording source of the selected data exists in the moving destination designated by the designation unit, the selected data is deleted from the recording medium as the recording source.

There is also provided a recording and reproducing method which records and reproduces data with respect to a plurality of recording media, comprising: a display step of simultaneously displaying, on a display screen having a display area for each recording medium, data recorded onto recording media in corresponding display areas; a selection step of selecting specific data from the data displayed on the display screen; a designation step of designating a moving destination of the selected data; and a step of, if a display area other than a recording medium as a recording source of the selected data exists in the designated moving destination, duplicating or moving the selected data to a recording medium corresponding to the display area.

There is also provided a recording and reproducing method which records and reproduces data with respect to a plurality of recording media, comprising: a display step of simultaneously displaying, on a display screen having a display area for each recording medium, data recorded onto recording media in corresponding display areas; a selection step of selecting specific data from the data displayed on the display screen; a designation step of designating a moving destination of the selected data; and a step of, if no display area other than a recording medium as a recording source of the selected data exists in the designated moving destination, deleting the selected data from the recording medium as the recording source.

The present invention simultaneously displays data of a plurality of recording media on the same screen. Therefore, the user can, e.g., duplicate, move, or erase an image with a simple operation while checking the contents of images recorded onto a plurality of recording media on the same screen. Also, the user can, e.g., duplicate, move, or erase an image with a simple operation even by using an apparatus having only a limited operation device which designates up, down, left, and right.

Further features of the present invention will become apparent from the following description of exemplary embodiments (with reference to the attached drawings).

DESCRIPTION OF THE EMBODIMENTS

Embodiments according to the present invention will be explained in detail below with reference to the accompanying drawings.

Note that the embodiments explained below are examples for implementing the present invention and should be appropriately modified or changed in accordance with the arrangement of an apparatus to which the present invention is applied or with various conditions, so the present invention is not limited to the following embodiments.

First Embodiment

This embodiment applies the present invention to a case in which data is deleted from a recording medium or duplicated between two recording media in an electronic apparatus such as a digital camera capable of using different types of recording media, i.e., an optical disk and memory card.

Figure 1:
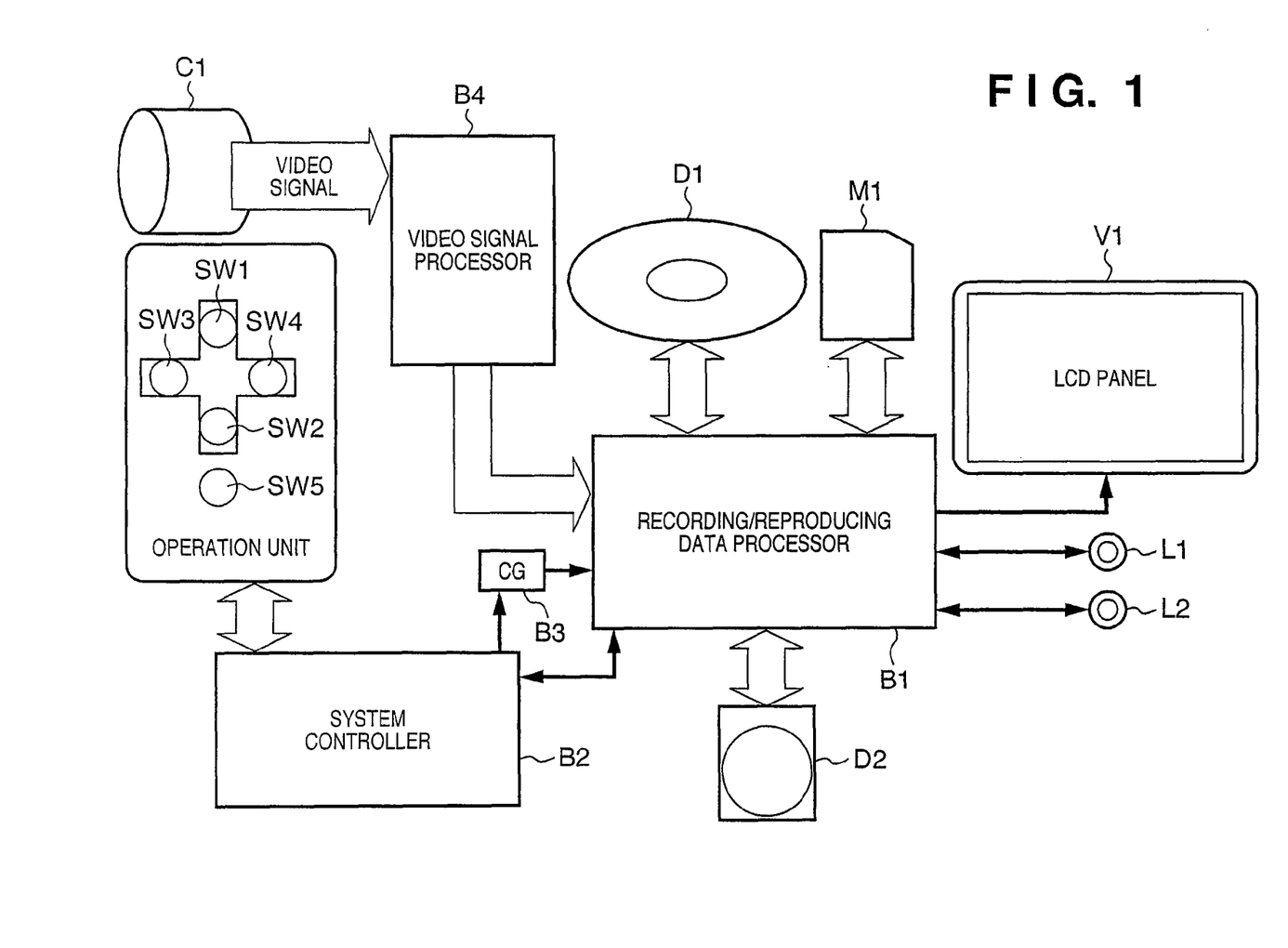
FIG. 1 is a block diagram showing a recording and reproducing apparatus of an embodiment according to the present invention.

FIG. 1 is a block diagram of a recording and reproducing apparatus of the embodiment according to the present invention.

In FIG. 1, reference symbol C1 denotes an image sensing unit which converts an object into a video signal. Reference symbol B1 denotes a recording/reproducing data processor which performs processing by which a video signal processed by a video signal processor B4 is compressed and recorded onto a recording medium such as an optical disk, memory card, or hard disk, and processing which reproduces image data from a recording medium.

Reference symbol B2 denotes a system controller which controls the individual units; B3, a character signal generator for image display; and B4, the video signal processor which processes the video signal from the image sensing unit C1.

Reference symbol D1 denotes an optical disk drive unit which writes data on an optical disk; D2, a hard disk drive unit which writes data on a hard disk; and M1, a memory card controller and memory card slot for writing data on a memory card.

Reference symbol V1 denotes a liquid crystal panel which displays photographed images and reproduced images; L1, a video signal input/output terminal for inputting and outputting video signals; and L2, an audio signal input/output terminal for inputting and outputting audio signals.

Reference symbol SW1 denotes an up switch for designating the upward direction; SW2, a down switch for designating the downward direction; SW3, a left switch for designating the leftward direction; and SW4, a right switch for designating the rightward direction.

Reference symbol SW5 denotes a media select switch for selecting a recording medium to be operated in a data management mode to be described below.

Figure 2:
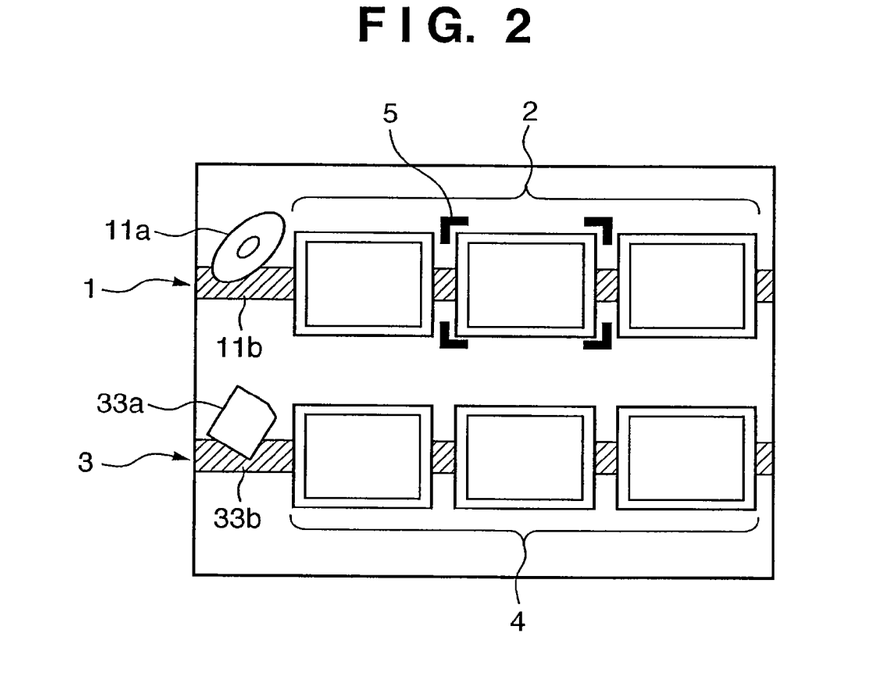
FIG. 2 is a view showing an example of a data management screen of the first embodiment according to the present invention.

FIG. 2 is a view showing an example of a screen in the data management mode of the recording and reproducing apparatus of this embodiment.

In this embodiment, the data management mode is defined as a mode in which the user performs an operation such as data movement, duplication, or deletion while checking the contents of each recording medium.

Referring to FIG. 2, a reference numeral 1 indicates a data display area on an optical disk denoted by an optical disk mark 11a and band 11b. Rectangles 2 displayed on the band 11b represent image data on the optical disk.

A reference numeral 3 indicates a data display area in a memory card denoted by a memory card mark 33a and band 33b. Rectangles 4 displayed on the band 33b represent image data in the memory card.

Brackets 5 represent an image selection cursor. An image selected by this cursor is the object of an operation such as duplication, movement, or deletion.

Note that in this embodiment, images are recorded in order from the left to the right in each medium, and images also exist in positions not shown on the screen. Note also that the array of images is determined based on a predetermined rule such as file format or the date.

<Operation Flow>

The operation of the recording and reproducing apparatus of the first embodiment will be explained below with reference to a flowchart shown in FIG. 3. Note that the following explanation does not refer to a method of proceeding to the data management mode. This proceeding operation can be performed by, e.g., operating a switch or the like from the reproduction mode of each recording medium, or selecting and determining procession to a data management screen by choice from a menu or the like. In this embodiment, the operation will be explained from a state in which the process has already proceeded to the data management mode.

Figure 3:
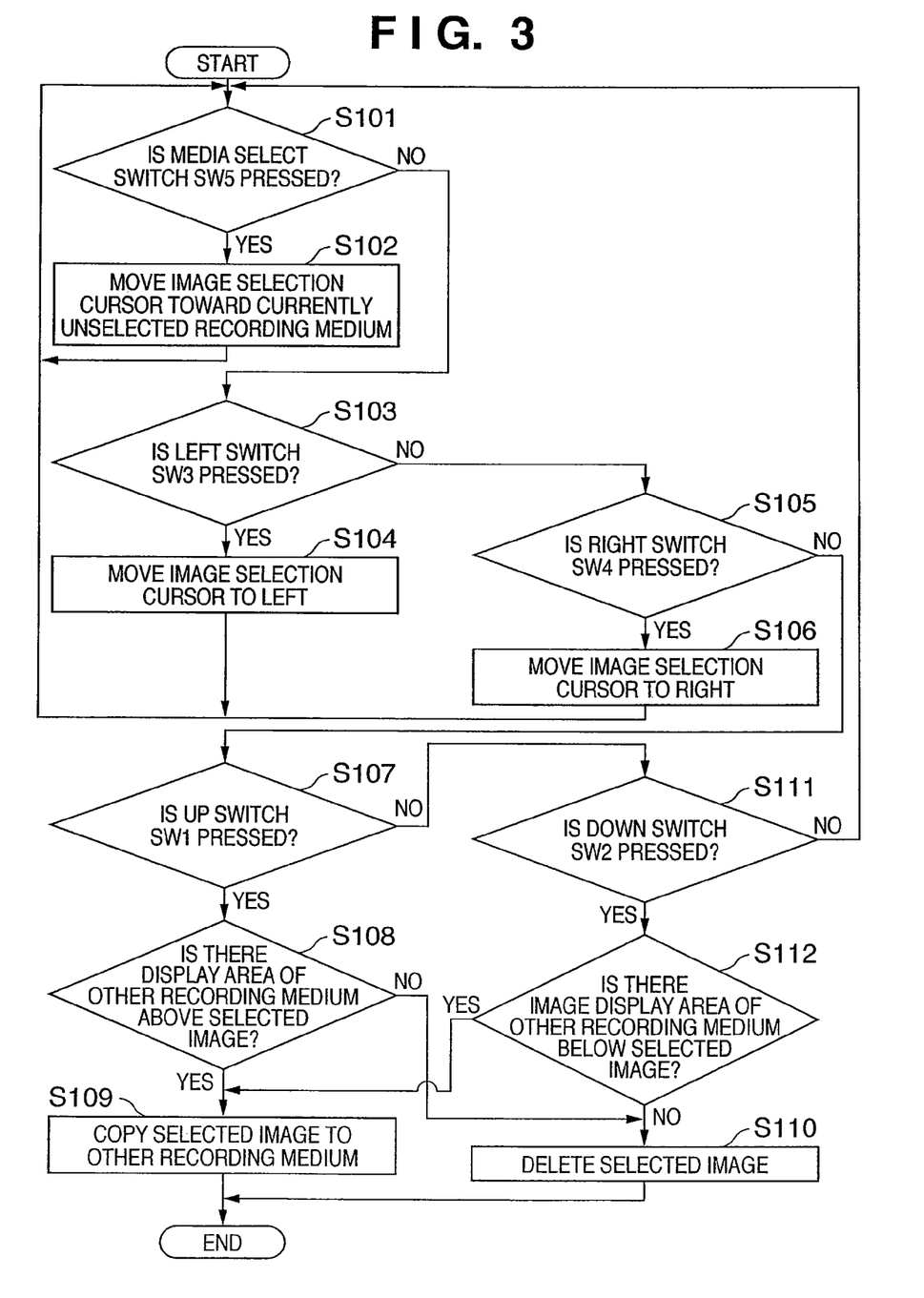
FIG. 3 is a flowchart showing the operation of the first embodiment according to the present invention.

FIG. 3 is an operation flow of the recording and reproducing apparatus of the embodiment according to the present invention. The system controller B2 implements this operation flow by executing a control program written in a ROM.

In step S101 of FIG. 3, the system controller B2 determines whether the media select switch SW5 is pressed. If the result is YES in step S101, the process advances to step S102. If the result is NO in step S101, the process advances to step S103.

In step S102, the system controller B2 moves the image selection cursor to an image of a recording medium which is not currently selected. Media to be operated can be easily switched by, e.g., moving the cursor toward the memory card if an image on the optical disk is selected, or moving the cursor toward the optical disk if an image in the memory card is selected. After moving the cursor, the process returns to step S101.

In step S103, the system controller B2 determines whether the left switch SW3 is pressed. If the result is YES in step S103, the process advances to step S104. If the result is NO in step S103, the process advances to step S105.

In step S104, the system controller B2 moves the image selection cursor to the left. Note that if an image in the leftward direction is not drawn on the screen, the system controller B2 scrolls an image group of the recording medium currently being selected. Note also that if the first image in the array is currently being selected, the system controller B2 does not move the cursor or moves the cursor to the last image. This cursor movement allows the user to freely view images on the selected recording medium. After moving the cursor, the process returns to step S101.

In step S105, the system controller B2 determines whether the right switch SW4 is pressed. If the result is YES in step S105, the process advances to step S106. If the result is NO in step S105, the process advances to step S107.

In step S106, the system controller B2 moves the image selection cursor to the right. If an image in the rightward direction is not drawn on the screen, the system controller B2 scrolls the image group of the recording medium currently being selected. Also, if the last image in the array is currently being selected, the system controller B2 does not move the cursor or moves the cursor to the first image. After moving the cursor, the process returns to step S101.

In step S107, the system controller B2 determines whether the up switch SW1 is pressed. If the result is YES in step S107, the process advances to step S108. If the result is NO in step S107, the process advances to step S111.

In step S108, the system controller B2 determines whether there is a display area of an unselected recording medium above the currently selected image. If there is a display area of an unselected recording medium, the process advances to step S109; if not, the process advances to step S110.

Figure 4:
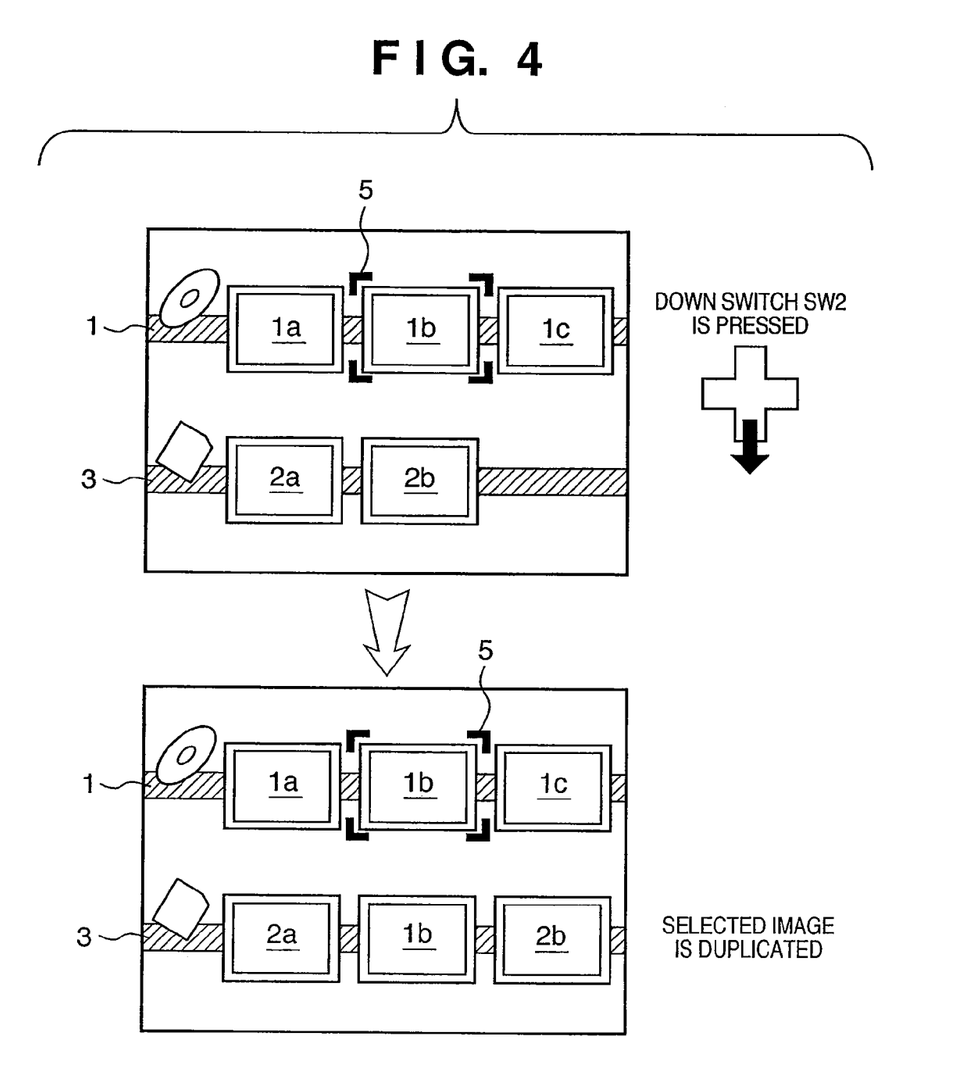
FIG. 4 is a view for explaining an image duplicating operation of the second embodiment according to the present invention.

In step S109, the system controller B2 duplicates a currently selected image 1*b* to the other recording medium (memory card) (FIG. 4) because the switch has been pressed toward the other recording medium, and then terminates the image duplicating operation. Although a detailed explanation will be omitted, the user can freely determine whether to maintain the data management mode or proceed to another mode after the image duplicating operation is terminated.

Figure 5:
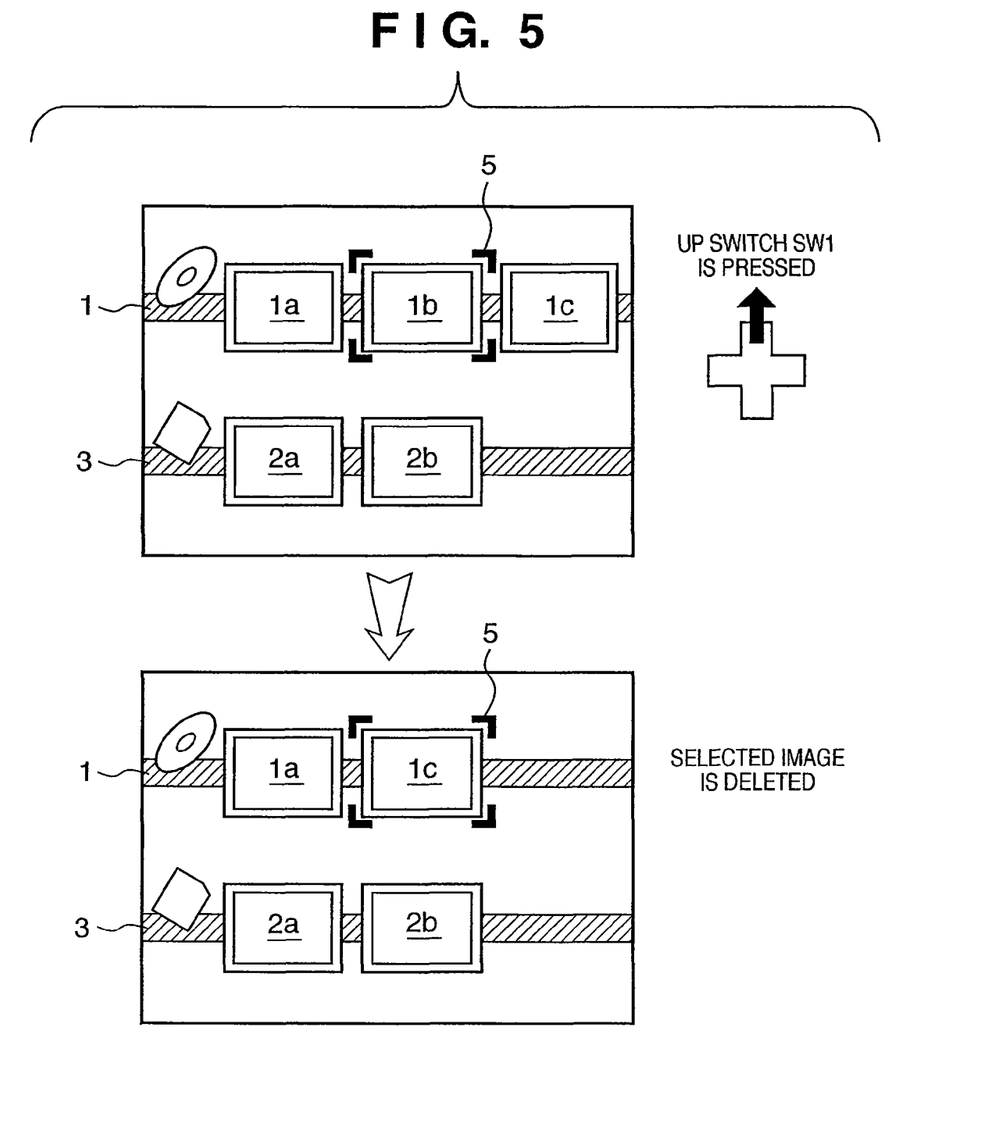
FIG. 5 is a view for explaining an image erasing operation of the first embodiment according to the present invention.

In step S110, the system controller B2 erases the selected image 1*b* from the recording medium because the switch has been pressed outside the screen (FIG. 5), and then terminates the image erasing operation. After the image erasing operation is terminated, the user can freely determine whether to maintain the data management mode or proceed to another mode.

In step S111, the system controller B2 determines whether the down switch SW2 is pressed. If the result is YES in step S111, the process advances to step S112. If the result is NO in step S111, the process returns to step S101.

In step S112, the system controller B2 determines whether there is a display area of an unselected recording medium below the currently selected image. If there is a display area of an unselected recording medium, the process advances to step S109; if not, the process advances to step S110. The system controller B2 then executes the same processing as above.

The above embodiment allows the user to check the contents of images of an optical disk and memory card on the same screen. In addition, the user can erase a selected image by pressing the switch outside the screen, or duplicate a selected image to the other recording medium by pressing the switch toward the other recording medium, with a simple operation.

Second Embodiment

This embodiment applies the present invention to a case in which data is duplicated from a recording medium in an electronic apparatus capable of using three different types of recording media, i.e., an optical disk, memory card, and hard disk. Note that the apparatus configuration for implementing this embodiment is the same as FIG. 1, so an explanation thereof will be omitted.

Figure 6:
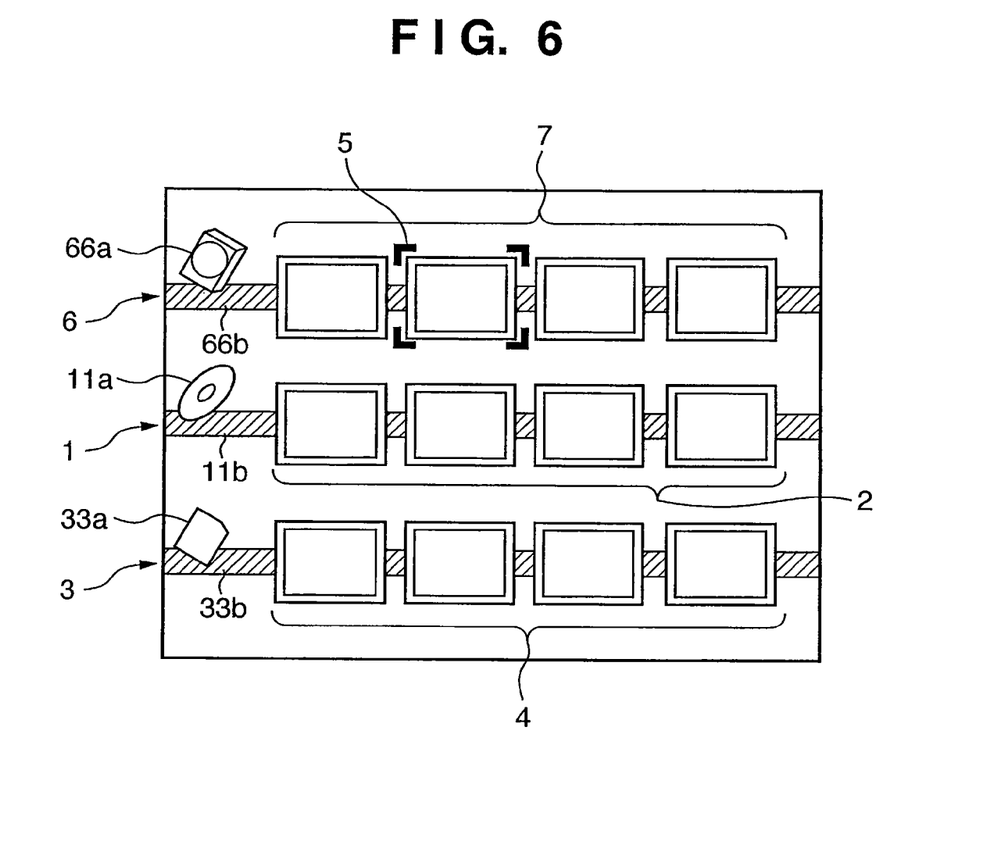
FIG. 6 is a view showing an example of a data management screen of the second embodiment according to the present invention.

FIG. 6 shows an example of a screen in a data management mode of this embodiment. In this embodiment, the number of recording media increases to three from two in the first embodiment, so the number of stages of data display areas in the data management mode also increases to three. That is, a data display area on a hard disk is added to the display areas shown in FIG. 2. Note that this embodiment need only have at least three display areas, and this number increases or decreases in accordance with the number of recording media.

A reference numeral 6 indicates the data display area on the hard disk denoted by a hard disk mark 66*a* and band 66*b*, and rectangles 7 displayed on the band 66*b* represent image data on the hard disk. Reference numerals 1 to 4 denote data display areas on an optical disk or in a memory card as in FIG. 2. Brackets 5 represent an image selection cursor.

[Operation Flow]

The operation of the recording and reproducing apparatus of the second embodiment will be explained below with reference to a flowchart shown in FIG. 7. Note that in the following explanation, the operation of proceeding to the data management mode can be performed by, e.g., operating a switch or the like from the reproduction mode of each recording medium, or selecting and determining procession to a data management screen by choice from a menu or the like.

Figure 7:
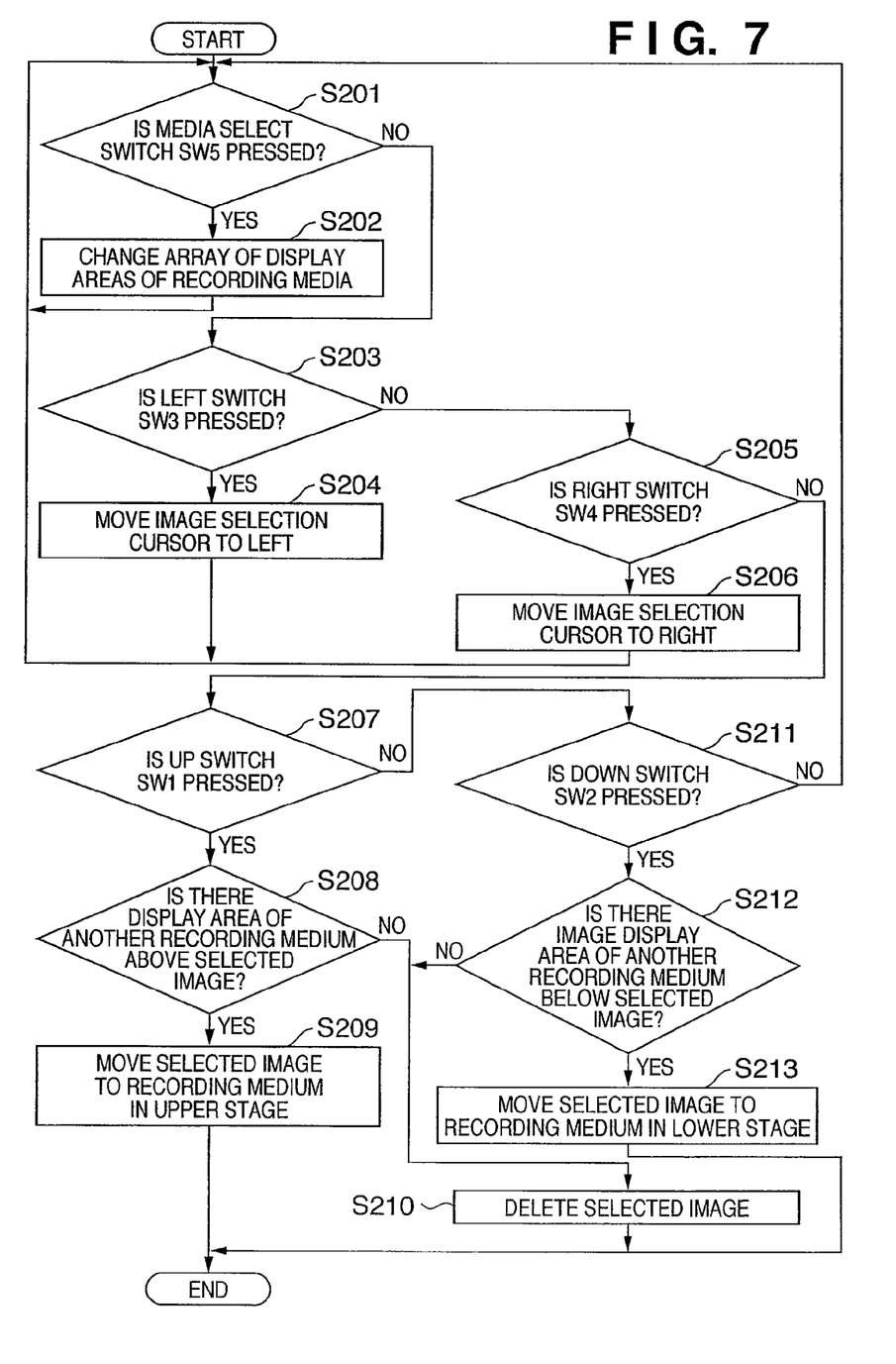
FIG. 7 is a flowchart showing the operation of the second embodiment according to the present invention.

FIG. 7 is an operation flow of the recording and reproducing apparatus of the embodiment according to the present invention. A system controller B2 implements this operation flow by executing a control program written in a ROM.

In step S201 of FIG. 7, the system controller B2 determines whether a media select switch SW5 is pressed. If the result is YES in step S201, the process advances to step S202. If the result is NO in step S201, the process advances to step S203.

Figure 8:
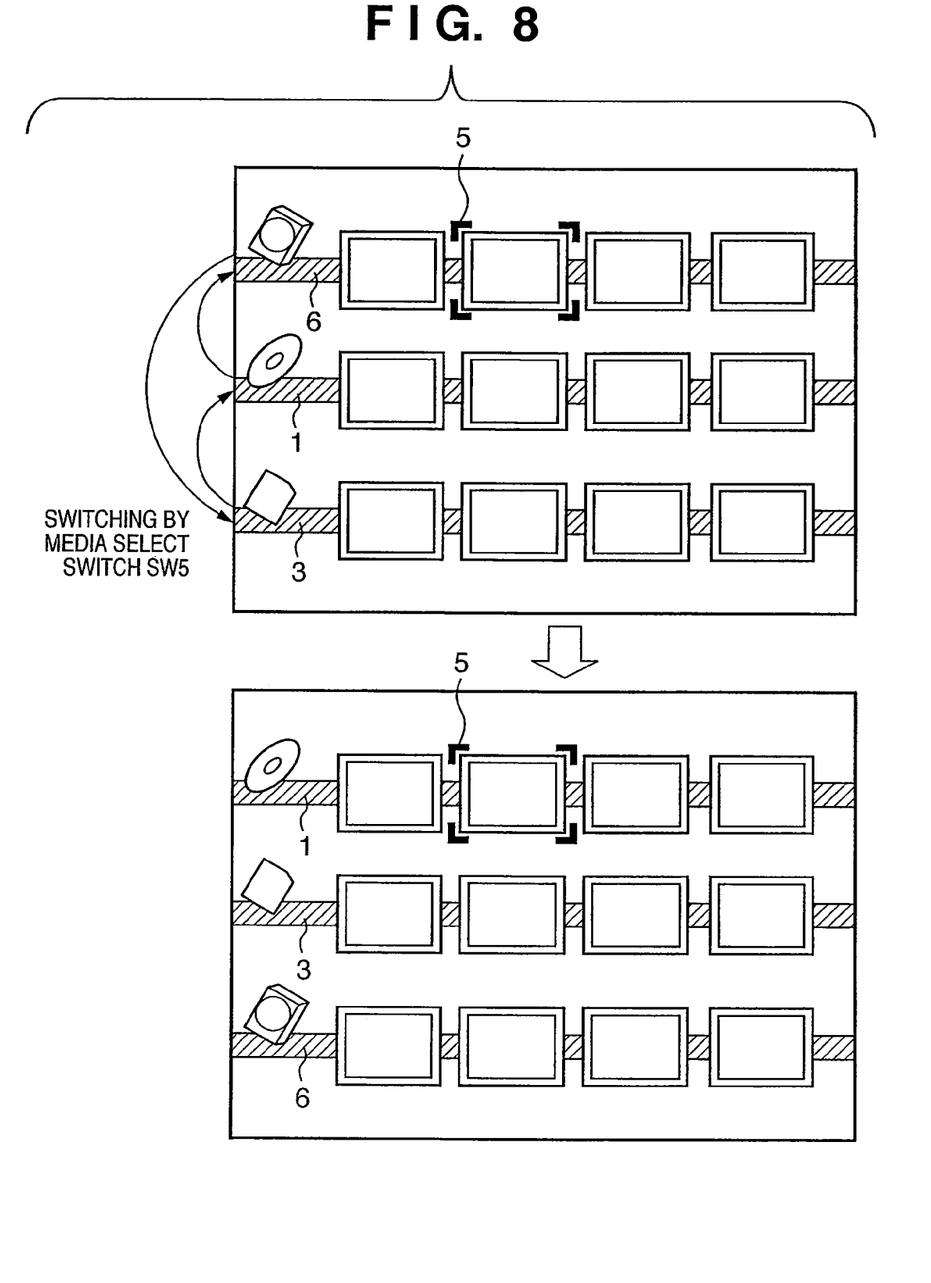
FIG. 8 is a view for explaining a display area array changing operation of the second embodiment according to the present invention.

In step S202, the system controller B2 changes the array of the display areas of the recording media, instead of moving the image selection cursor, unlike in the first embodiment (FIG. 8). That is, in the above-mentioned method of erasing an image by moving the image selection cursor outside the screen, an image selected in a recording medium whose display area is positioned in the second stage cannot be erased because the image selection cursor cannot be moved outside the screen. As shown in FIG. 8, therefore, if a display area corresponding to a recording medium containing a selected image is sandwiched between other display areas, the system controller B2 changes the array of the display areas so as to display the display area corresponding to the recording medium as the recording source in the uppermost stage. Note that when erasing an image by pressing a down switch SW2, it is only necessary to change the array of the display areas so as to display the display area corresponding to the recording medium as the recording source in the lowermost stage.

After changing the array of the display areas as shown in FIG. 8, the process returns to step S201.

In step S203, the system controller B2 determines whether a left switch SW3 is pressed. If the result is YES in step S203, the process advances to step S204. If the result is NO in step S203, the process advances to step S205.

In step S204, the system controller B2 moves the image selection cursor to the left. If an image in the leftward direction is not drawn on the screen, the system controller B2 scrolls an image group of the recording medium currently being selected. If the first image in the array is currently being selected, the system controller B2 does not move the cursor or moves the cursor to the last image. This cursor movement allows the user to freely view images on the selected recording medium. After moving the cursor, the process returns to step S201.

In step S205, the system controller B2 determines whether a right switch SW4 is pressed. If the result is YES in step S205, the process advances to step S206. If the result is NO in step S205, the process advances to step S207.

In step S206, the system controller B2 moves the image selection cursor to the right. If an image in the rightward direction is not drawn on the screen, the system controller B2 scrolls the image group of the recording medium currently being selected. Also, if the last image in the array is currently being selected, the system controller B2 does not move the cursor or moves the cursor to the first image. After moving the cursor, the process returns to step S201.

In step S207, the system controller B2 determines whether an up switch SW1 is pressed. If the result is YES in step S207, the process advances to step S208. If the result is NO in step S207, the process advances to step S211.

In step S208, the system controller B2 determines whether there is a display area of an unselected recording medium above the currently selected image. If there is a display area of an unselected recording medium, the process advances to step S209; if not, the process advances to step S210.

In step S209, the system controller B2 moves the currently selected image to the recording medium drawn in the upper stage because the switch has been pressed toward this recording medium, and then terminates the image duplicating operation. Note that after the image duplicating operation is terminated, the user can freely determine whether to maintain the data management mode or proceed to another mode.

In step S210, the system controller B2 erases the selected image from the recording medium because the switch has been pressed outside the screen, and then terminates the image erasing operation. Note that after the image erasing operation is terminated, the user can freely determine whether to maintain the data management mode or proceed to another mode.

In step S211, the system controller B2 determines whether the down switch SW2 is pressed. If the result is YES in step S211, the process advances to step S212. If the result is NO in step S211, the process returns to step S201.

In step S212, the system controller B2 determines whether there is a display area of an unselected recording medium below the currently selected image. If there is a display area of an unselected recording medium, the process advances to step S213; if not, the process advances to step S210.

Figure 9:
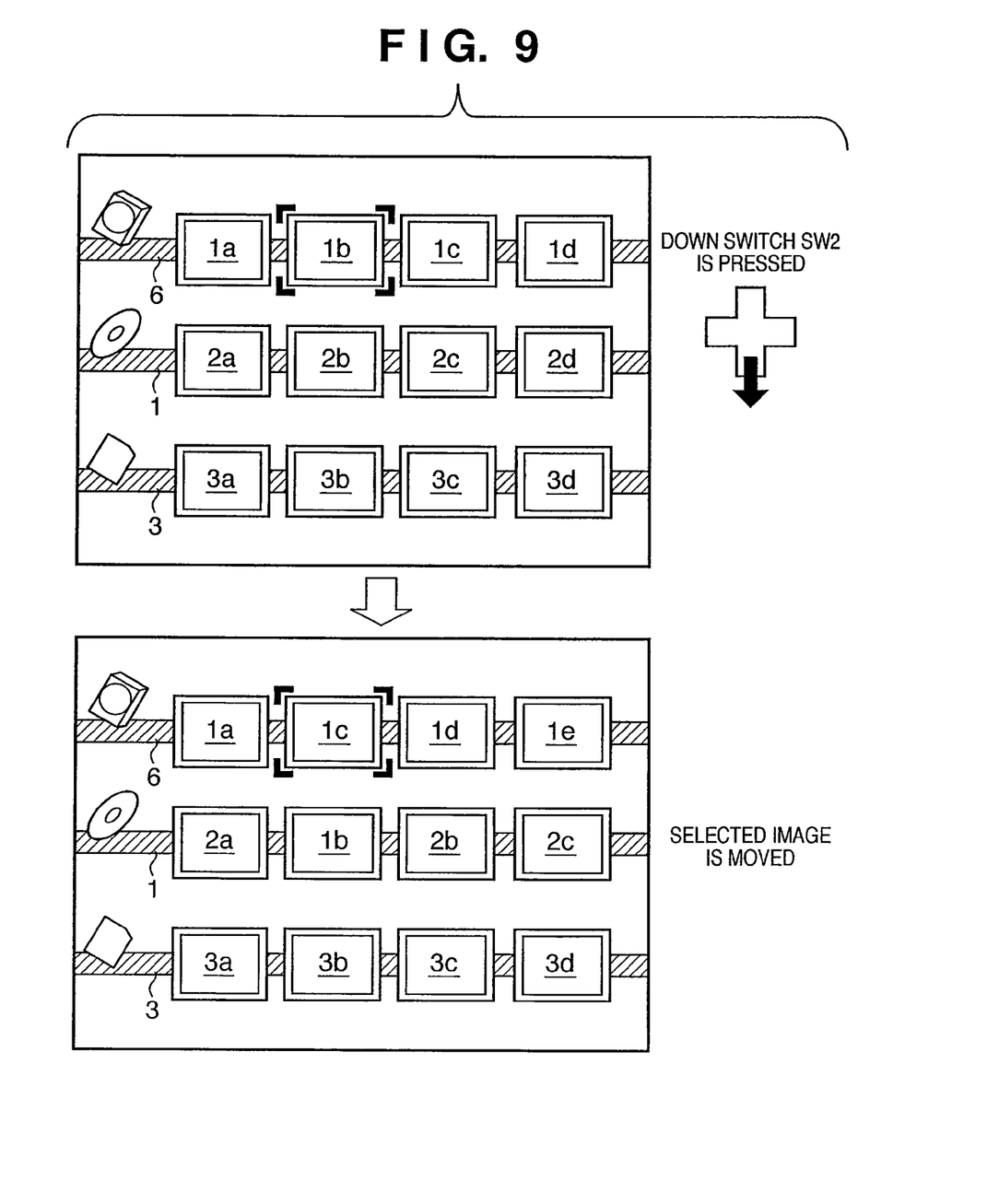
FIG. 9 is a view for explaining an image moving operation of the second embodiment according to the present invention.

In step S213, the system controller B2 moves a currently selected image 1b to the recording medium (optical disk) drawn in the lower stage because the switch has been pressed toward this recording medium (FIG. 9), and then terminates the image moving operation. Note that after the image duplicating operation is terminated, the user can freely determine whether to maintain the data management mode or proceed to another mode.

The above embodiment allows the user to check the contents of images of a hard disk, optical disk, and memory card on the same screen. In addition, the user can erase a selected image by pressing the switch outside the screen, or move a selected image to another recording medium by pressing the switch toward the other recording medium, with a simple operation.

Other Embodiment

The embodiments according to the present invention have been described in detail above by using the practical examples, but the present invention can take the form of an embodiment as, e.g., a system, apparatus, method, program, or storage medium (recording medium). More specifically, the present invention is applicable to a system comprising a plurality of devices, or an apparatus comprising a single device.

Also, it is naturally possible to achieve the object of the present invention regardless of which part of the functional blocks and operations shown in the drawings is implemented by a hardware circuit or software processing using a computer.

Note that the present invention can also be achieved by supplying a software program for implementing the functions of the above-mentioned embodiments to a system or apparatus directly or from a remote place. In this case, a computer of the system or the like reads out and executes the program code.

Accordingly, the program code itself installed in a computer to implement the functional processing of the present invention by the computer also implements the present invention. That is, the present invention includes the computer program itself for implementing the functional processing of the invention.

In this case, the program can take any form as long as it has the function of a program. Examples are an object code, a program executed by an interpreter, and script data to be supplied to an OS.

Examples of a recording medium (storage medium) for supplying the program are a flexible disk, hard disk, optical disk, and magnetooptical disk. Other examples are an MO, CD-ROM, CD-R, CD-RW, magnetic tape, nonvolatile memory card, ROM, and DVD (DVD-ROM and DVD-R).

The program can also be supplied by connecting to a homepage of the Internet by using the browser of a client computer, and downloading the computer program itself of the present invention from the homepage, or by downloading a compressed file containing an automatic installation function to a recording medium such as a hard disk. It is also possible to divide the program code forming the program of the present invention into a plurality of files, and download the individual files from different homepages. That is, the present invention also includes a WWW server which allows a plurality of users to download program files for implementing the functional processing of the present invention by a computer.

Furthermore, it is possible to encrypt the program of the present invention, distribute the encrypted program to users by storing the program in a storage medium such as a CD-ROM, and allows a user who has cleared predetermined conditions to download key information for decryption from a homepage across the Internet. In this case, the user implements the functional processing of the present invention by executing the encrypted program by using the downloaded key information, thereby installing the program in a computer.

The functions of the above embodiments may also be implemented by executing the readout program by a computer, or by causing an OS or the like running on the computer to perform part or the whole of actual processing based on instructions by the program.

Moreover, it is possible to implement the functions of the above embodiments by writing the program read out from the recording medium in a memory of a function expansion board inserted into the computer or of a function expansion unit connected to the computer, and performing part or the whole of actual processing by a CPU or the like of the board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-041656, filed Feb. 17, 2006, which is hereby incorporated by reference herein in its entirety.

What is claimed is:

1. A recording and reproducing apparatus which records and reproduces data with respect to at least one recording media, comprising:
   a display unit adapted to simultaneously display data recorded on the recording medium on a first display area of a display screen;
   a selection unit adapted to select specific data from the data displayed on the first display area; and
   a direction designation unit adapted to designate a direction to the selected data,
   wherein the display unit is adapted to display at least one second display area to which the selected data on the first display area is enabled to be shifted,
   wherein the second display area locates in a predetermined direction with regard to a position of the selected data which is on the first display area,
   a shift unit adapted to shift the selected data on the first display area to the second display area, if the direction designation unit designates the predetermined direction to the selected data, and
   a deleting unit adapted to delete the selected data on the first display area, if the direction designation unit designates the other direction different from the predetermined direction to the selected data.

2. The apparatus according to claim 1, wherein at least one second display area locates on the display screen.

3. The apparatus according to claim 1, wherein the data includes image data.

4. The apparatus according to claim 1, wherein the predetermined direction includes upward direction with regard to the display screen.

5. The apparatus according to claim 1, wherein the predetermined direction includes downward direction with regard to the display screen.

6. The apparatus according to claim 1, wherein the other direction is a direction opposite to the predetermined direction.

7. A data processing method for processing data with respect to at least one recording medium, comprising:
   displaying simultaneously data reproduced from the recording medium on a first display area of a display screen;
   selecting specific data from the data displayed on the first display area; and
   designating a direction to the data selected by selecting,
   wherein the displaying includes displaying at least one second display area to which the selected data on the first display area is enabled to be shifted,
   wherein the second display area locates in a predetermined direction with regard to a position of the selected data which is on the first display area,
   shifting the selected data on the first display area to the second display area, if the designating designates the predetermined direction to the selected data, and
   deleting the selected data on the first display area, if the designating designates the other direction different from the predetermined direction to the selected data.

8. The method according to claim 7, wherein at least one second display area locates on the display screen.

9. The method according to claim 7, wherein the data includes image data.

10. The method according to claim 7, wherein the predetermined direction includes upward direction with regard to the display screen.

11. The method according to claim 7, wherein the predetermined direction includes downward direction with regard to the display screen.

12. A non-transitory computer-readable storage medium comprising instructions to cause a computer to execute the method according to claim 7.

13. A recording and reproducing apparatus which records and reproduces data with respect to at least one recording media, comprising:
   a display unit adapted to simultaneously display data recorded on the recording medium on a first display area of a display screen;
   a selection unit adapted to select specific data from the data displayed on the first display area; and
   a direction designation unit adapted to designate a direction to the selected data,
   wherein the display unit is adapted to display a one second display area to which the selected data on the first display area is enabled to be shifted,
   wherein the second display area locates in a predetermined direction with regard to a position of the selected data which is on the first display area,
   a shift unit adapted to shift the selected data on the first display area to the second display area, if the direction designation unit designates the predetermined direction to the selected data, and
   a deleting unit adapted to delete the selected data on the first display area, if the direction designation unit designates a direction opposite to the predetermined direction to the selected data.

14. A data processing method for processing data with respect to at least one recording medium, comprising:
   displaying simultaneously data reproduced from the recording medium on a first display area of a display screen;
   selecting specific data from the data displayed on the first display area; and
   designating a direction to the data selected by selecting,
   wherein the displaying includes displaying a second display area to which the selected data on the first display area is enabled to be shifted,
   wherein the second display area locates in a predetermined direction with regard to a position of the selected data which is on the first display area,
   shifting the selected data on the first display area to the second display area, if the designating designates the predetermined direction to the selected data, and
   deleting the selected data on the first display area, if the designating designates a direction opposite to the predetermined direction to the selected data.

15. A non-transitory computer-readable storage medium comprising instructions to cause a computer to execute the method according to claim 14.

* * * * *